United States Patent
Sawachi

(10) Patent No.: US 7,033,695 B2
(45) Date of Patent: Apr. 25, 2006

(54) BATTERY HOUSING DEVICE

(75) Inventor: Youichi Sawachi, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 400 days.

(21) Appl. No.: 10/668,293

(22) Filed: Sep. 24, 2003

(65) Prior Publication Data

US 2004/0067413 A1    Apr. 8, 2004

(30) Foreign Application Priority Data

Sep. 26, 2002    (JP) .............................. 2002-280275

(51) Int. Cl.
*H01M 2/10* (2006.01)

(52) U.S. Cl. ......................................... 429/100; 429/99

(58) Field of Classification Search .................. 429/99, 429/100
See application file for complete search history.

(56) References Cited

FOREIGN PATENT DOCUMENTS

| | | | |
|---|---|---|---|
| DE | 20202325 | * | 10/2002 |
| JP | 07-045263 A | | 2/1995 |
| JP | 10-255748 A | | 9/1998 |
| JP | 2001-236936 A | | 8/2001 |
| JP | 2003-178733 | * | 6/2003 |

* cited by examiner

*Primary Examiner*—Patrick Joseph Ryan
*Assistant Examiner*—Thomas H. Parsons
(74) *Attorney, Agent, or Firm*—Sughrue Mion, PLLC

(57) ABSTRACT

In the battery housing device, batteries are housed in a battery cartridge and connected in series to each other with terminals thereof being in direct contact with each other. A fulcrum capable of coming into contact with a periphery of the first battery is arranged on an inner surface of the battery cartridge. An elastic body is arranged on an inner surface of a battery cartridge housing, in which the battery cartridge is inserted. When the battery cartridge is gotten inserted into or extracted from the battery cartridge housing, the elastic body presses the periphery of the first battery continuously from an area distant from the fulcrum to another area distant from the fulcrum across an area near the fulcrum to make the first battery wobble about the fulcrum, thereby making the terminal of the first battery to rub against the terminal of the second battery.

3 Claims, 3 Drawing Sheets

BATTERY HOUSING DEVICE

BACKGROUND OF THE INVENTION

1. Field of the Invention

The present invention relates to a battery housing device that houses a pair of batteries connected in series to each other with terminals thereof being in direct contact with each other.

2. Description of the Related Art

A battery housing device houses a pair of batteries connected in series to each other with the terminals thereof being in direct contact with each other. The battery housing device can have a smaller size and be more inexpensive, since no medium conductor is necessary between the terminals of the series batteries in direct contact. However, such a battery housing device has a possibility that a stain or rust on the contact surfaces of the terminals of the paired batteries causes a contact failure and, therefore, a voltage drop in the battery assembly. In an electronic apparatus provided with such a battery housing device, more particularly, in a digital camera, for example, the voltage drop of the battery assembly results in a decrease of the number of pictures that can be taken.

Japanese Patent Application Publication No. 2001-236936 discloses a battery cartridge on which four batteries or a battery package can be selectively mounted and an electronic apparatus using the same battery cartridge. Japanese Patent Application Publication No. 10-255748 discloses a battery insertion mechanism, in which a battery housing adapted to house four batteries is pivotally attached to an outer housing of an electronic apparatus and housed in a recess in the outer housing of the electronic apparatus to serve as a lid for the recess. In these publications, there is no description of a device that removes stains on the terminals of the batteries.

Japanese Patent Application Publication No. 7-45263 discloses a battery case that is adapted to rotate a battery about its axis in response to sliding of a power switch to make a terminal of the battery rub against a fixed edge portion, thereby wiping out stains on the surface on the terminal of the battery. However, this battery case has a disadvantage that the load of the sliding of the power switch is high.

SUMMARY OF THE INVENTION

An object of the present invention is to provide a battery housing device that houses batteries connected in series to each other with terminals thereof being in direct contact with each other, in which stains on the terminals of the batteries that are in contact with each other can be readily removed without needing a significant effort of the operator, and thus, the contact resistance between the terminals can be reduced.

In order to attain the above-described object, the present invention is directed to a battery housing device, comprising: a battery cartridge which houses a first battery and a second battery connected in series to each other with a terminal of a polarity at an end of the first battery being pressed against and in direct contact with a terminal of an opposite polarity at an end of the second battery; a battery cartridge housing into which the battery cartridge is inserted; a fulcrum which is arranged on an inner surface of the battery cartridge and configured to come into contact with a periphery of the first battery; and an elastic body which is arranged on an inner surface of the battery cartridge housing, wherein when the battery cartridge is gotten inserted into and extracted from the battery cartridge housing, the elastic body presses the periphery of the first battery continuously from an area distant from the fulcrum to another area distant from the fulcrum across an area near the fulcrum to make the first battery wobble about the fulcrum, thereby making the terminal of the first battery rub against the terminal of the second battery.

According to the present invention, a first battery and a second battery are housed in a battery cartridge. The first and second batteries are connected in series to each other with a terminal of a polarity at an end of the first battery being pressed against and in direct contact with a terminal of the opposite polarity at an end of the second battery. The battery cartridge is housed in a battery cartridge housing. A fulcrum capable of coming into contact with a periphery of the first battery is arranged on an inner surface of the battery cartridge, and an elastic body is arranged on an inner surface of the battery cartridge housing. When the battery cartridge is gotten inserted into or extracted from the battery cartridge housing, the elastic body presses the periphery of the first battery at an area distant from the fulcrum to make the first battery wobble about the fulcrum, thereby making the terminal of the first battery rub against the terminal of the second battery. Thereby, stains on the terminals of the batteries that are in contact with each other can be readily removed without needing a significant effort of the operator, and thus, the contact resistance between the terminals can be reduced.

In order to attain the above-described object, the present invention is also directed to a battery housing device, comprising: a battery cartridge which houses first, second, third and fourth batteries, the first battery and the second battery being connected in series to each other with a terminal of a polarity at an end of the first battery being pressed against and in direct contact with a terminal of an opposite polarity at an end of the second battery, the third battery and the fourth battery being connected in series to each other with a terminal of a polarity at an end of the third battery being pressed against and in direct contact with a terminal of an opposite polarity at an end of the fourth battery, the first battery and the third battery being disposed parallel to each other, the second battery and the fourth battery being disposed parallel to each other; a battery cartridge housing into which the battery cartridge is inserted; a first fulcrum which is arranged on an inner surface of the battery cartridge and configured to come into contact with a periphery of the first battery; a second fulcrum which is arranged on the inner surface of the battery cartridge and configured to come into contact with a periphery of the third battery; and first and second elastic bodies which are arranged on an inner surface of the battery cartridge housing, wherein when the battery cartridge is gotten inserted into and extracted from the battery cartridge housing, the first elastic body presses the periphery of the first battery continuously from an area distant from the first fulcrum to another area distant from the first fulcrum across an area near the first fulcrum to make the first battery wobble about the first fulcrum, thereby making the terminal of the first battery rub against the terminal of the second battery, and the second elastic body presses the periphery of the third battery continuously from an area distant from the second fulcrum to another area distant from the second fulcrum across an area near the second fulcrum to make the third battery wobble about the second fulcrum, thereby making the terminal of the third battery rub against the terminal of the fourth battery.

According to the present invention, first to fourth batteries are housed in a battery cartridge. The first and second batteries are connected in series to each other with a terminal of a polarity at an end of the first battery being pressed against and in direct contact with a terminal of the opposite polarity at an end of the second battery. The third and fourth batteries are connected in series to each other with a terminal of a polarity at an end of the third battery being pressed against and in direct contact with a terminal of the opposite polarity at an end of the fourth battery. The first and third batteries are disposed parallel to each other, and the second and fourth batteries are disposed parallel to each other. The battery cartridge is housed in a battery cartridge housing. First and second fulcrums are arranged on an inner surface of the battery cartridge. The first fulcrum is capable of coming into contact with a periphery of the first battery, and the second fulcrum is capable of coming into contact with a periphery of the third battery. A first elastic body is arranged on an inner surface of the battery cartridge housing. When the battery cartridge is gotten inserted into or extracted from the battery cartridge housing, the first elastic body presses the periphery of the first battery continuously from an area distant from the first fulcrum to another area distant from the first fulcrum across an area near the first fulcrum to make the first battery wobble about the first fulcrum, thereby making the terminal of the first battery to rub against the terminal of the second battery. A second elastic body is arranged on the inner surface of the battery cartridge housing. When the battery cartridge is gotten inserted into or extracted from the battery cartridge housing, the second elastic body presses the periphery of the third battery continuously from an area distant from the second fulcrum to another area distant from the second fulcrum across an area near the second fulcrum to make the third battery wobble about the second fulcrum, thereby making the terminal of the third battery to rub against the terminal of the fourth battery. Thereby, stains on the terminals of the batteries that are in contact with each other can be readily removed without needing a significant effort of the operator, and thus, the contact resistance between the terminals can be reduced.

Preferably, the first and second fulcrums are substantially aligned with each other in an insertion direction of the battery cartridge; and the first and second elastic bodies are located at positions spaced apart from each other in the insertion direction of the battery cartridge by a distance substantially equal to a half of a length of the first and third batteries.

According to the present invention, the first and third batteries are advantageously prevented from colliding with each other when the first and third batteries wobble, and the load caused by the first and third batteries wobbling when the battery cartridge is gotten inserted into and extracted from the battery cartridge housing is not increased.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
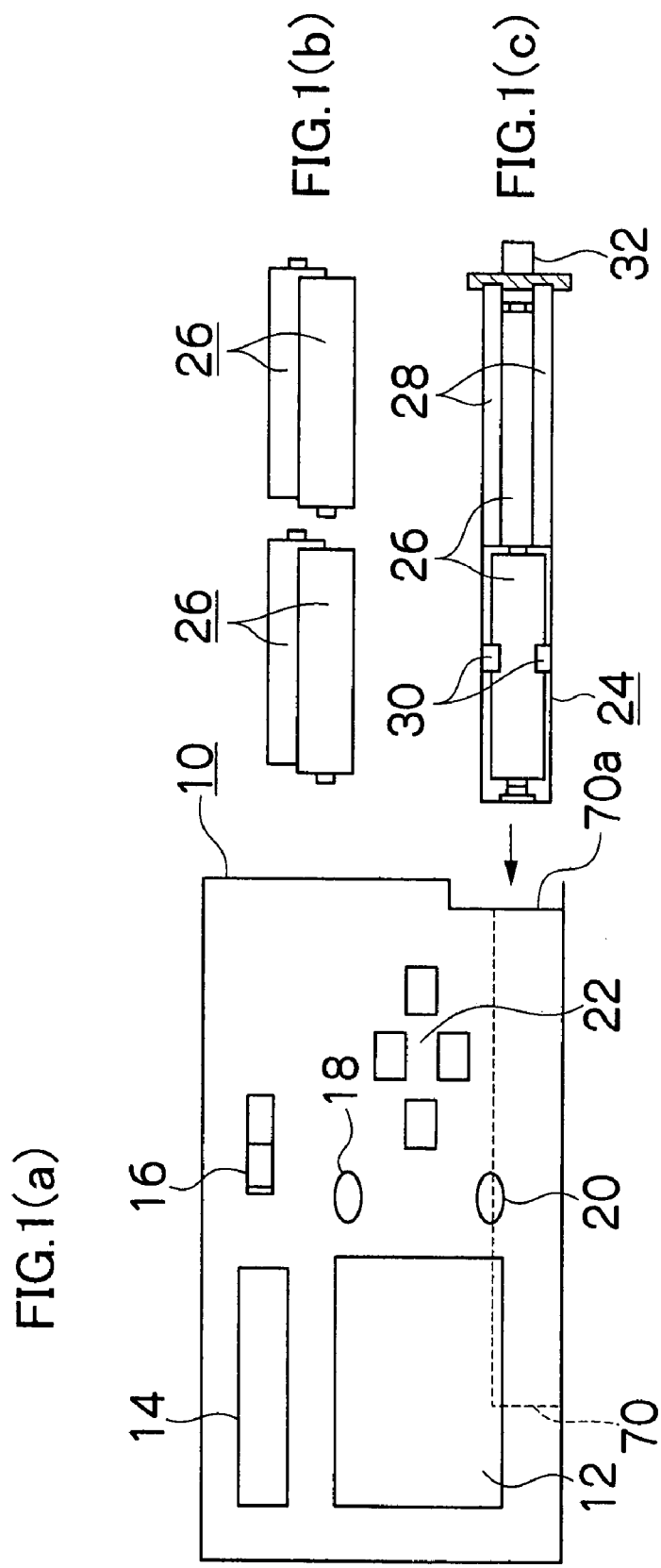
FIG. 1(a) is a rear view of a digital camera main unit which is an example of an electronic apparatus having a battery housing device according to an embodiment of the present invention.
FIG. 1(b) shows batteries to be housed in a battery cartridge.
FIG. 1(c) is a sectional view of the battery cartridge to be housed in a battery cartridge housing of the digital camera main unit.

In the following, a digital camera, a battery cartridge to be housed in a battery cartridge housing of the digital camera, and a battery to be housed in the battery cartridge will be described with reference to the accompanying drawings.

FIG. 1(a) is a rear view of a digital camera main unit 10. On a rear panel of the digital camera main unit 10, there are provided a liquid crystal monitor 12, a liquid crystal indicator 14, a power switch 16, a menu/execution button 18, a cancel button 20, and an operation button assembly 22 including four buttons. On a front face of the digital camera main unit 10, a taking lens device (not shown) is provided.

In the lower part of the digital camera 10, a battery cartridge housing 70 extending horizontally is formed, and an insertion opening 70a of the battery cartridge housing 70 is formed at the lower end of the right-hand side of the digital camera 10 in FIG. 1 (a). A battery cartridge 24 shown in FIG. 1(c) is inserted into the battery cartridge housing 70 through the insertion opening 70a.

The battery cartridge 24 is configured to house four batteries 26 of the same type shown in FIG. 1(b). The battery 26 may be either of a primary (non-rechargeable) battery and a secondary (rechargeable) battery, and may be either of a size D, a size C, a size AA, a size AAA, a size N, and the like.

Figure 2:
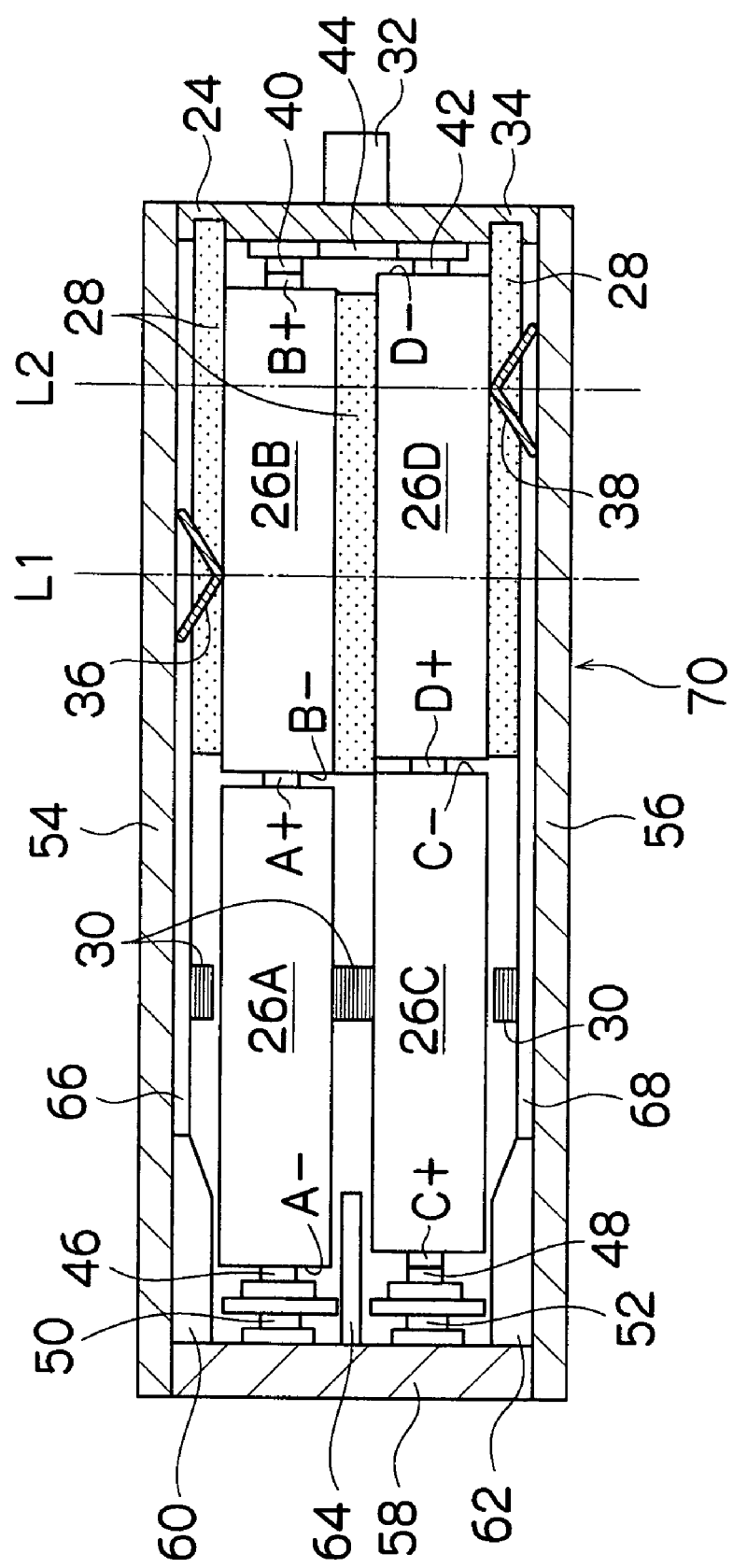
FIG. 2 is a sectional view of the battery cartridge which has the batteries housed therein and is fully inserted in the battery cartridge housing, viewed from above.

FIG. 2 is a sectional view of the battery cartridge 24 shown in FIG. 1(c) in a state where the battery cartridge 24 contains first, second, third and fourth batteries 26A, 26B, 26C and 26D and is completely housed in the battery cartridge housing 70 shown in FIG. 1(a), viewed from above. In the following, the battery cartridge 24 will be described with reference to FIGS. 1(c) and 2. Battery pressers 28 are located on side plates 66, 68 of the battery cartridge 24 and between the second battery 26B and the fourth battery 26D, and are intended to prevent the second and fourth batteries 26B and 26D from being displaced in the battery cartridge 24.

Ribs 30 serve as fulcrums (fulcrum ribs). There are clearances between the ribs 30 and the peripheries of the first and third batteries 26A and 26C, so that when the first and third batteries 26A and 26C move slightly, the peripheries of the first and third batteries 26A and 26C come into contact with the ribs 30 or get away from the ribs 30. The ribs 30 are made of a metal, synthetic resin or the like that is enough hard for the ribs to function as fulcrums for the first and third batteries 26A and 26C when the batteries 26A and 26C wobble.

The user can pick a knob 32 with his/her fingers to insert the battery cartridge 24 into the battery cartridge housing 70 or extract the same from the battery cartridge housing 70.

In the following, configurations of the battery cartridge 24 and the battery cartridge housing 70 will be further described with reference to FIG. 2. Side plates 54, 56 and a back plate 58 constitute a part of the battery cartridge housing 70. The side plates 54 and 56 are disposed parallel to each other, and the back plate 58 is disposed perpendicular to the side plates 54 and 56.

The first battery 26A and the second battery 26B housed in the battery cartridge 24 are connected in series to each other with a protruding terminal A+ of a polarity (positive, herein) at an end of the first battery 26A being pressed against and in direct contact with a planar terminal B− of the opposite polarity (negative, herein) at an end of the second battery 26B.

Furthermore, the third battery 26C and the fourth battery 26D housed in the battery cartridge 24 are connected in series to each other with a planar terminal C− of a polarity (negative, herein) at an end of the third battery 26C being pressed against and in direct contact with a protruding terminal D+ of the opposite polarity (positive, herein) at an end of the fourth battery 26D.

The first to fourth batteries 26A to 26D are arranged in the battery cartridge 24 with the first battery 26A and the third battery 26C being disposed parallel to each other, and the second battery 26B and the fourth battery 26D being disposed parallel to each other.

A terminal A− of the first battery 26A is in contact with a terminal 46 of the battery cartridge housing 70. The terminal 46 is fixedly connected to an external connection terminal 50 of the battery cartridge housing 70, and the terminal 50 is attached to the inner surface of the back plate 58. A terminal C+ of the third battery 26C is in contact with a terminal 48 of the battery cartridge housing 70. The terminal 48 is fixedly connected to an external connection terminal 52 of the battery cartridge housing 70, and the terminal 52 is attached to the inner surface of the back plate 58.

Guides 60, 62 having tapered ends are provided on the side plates 54, 56 of the battery cartridge housing 70 at areas close to the back plate 58, and a guide 64 is provided at the center of the back plate 58. The battery cartridge 24 has such a structure that it does not collide with these guides 60, 62 and 64 when it is inserted into the battery cartridge housing 70.

When the battery cartridge 24 is inserted into the battery cartridge housing 70 and completely pushed into it, the first and third batteries 26A and 26C are guided by the guides 60, 62 and 64 to be aligned with the second and fourth batteries 26B and 26D, respectively. Thus, it is assured that the terminal A+ of the first battery 26A is brought into contact with the terminal B− of the second battery 26B, the terminal A− of the first battery 26A is brought into contact with the terminal 46, the terminal C− of the third battery 26C is brought into contact with the terminal D+ of the fourth battery 26D, and the terminal C+ of the third battery 26C is brought into contact with the terminal 48.

A terminal B+ of the second battery 26B is in contact with a terminal 40 of the battery cartridge 24. A terminal D− of the fourth battery 26D is in contact with a terminal 42 of the battery cartridge 24. The terminals 40 and 42 are connected to each other through a connection part 44 of the battery cartridge 24. The terminals 40 and 42 and the connection part 44 are attached to the inner surface of an end plate 34 of the battery cartridge 24. The knob 32 is attached to the end plate 34 at the center of the outer surface thereof.

In this example, the first to fourth batteries 26A to 26D are connected in series between the external connection terminals 50 and 52 of the battery cartridge housing 70. However, the way of connection of the first to fourth batteries 26A to 26D is not limited thereto. For example, the first and second batteries 26A and 26B may be connected in series to each other, the third and fourth batteries 26C and 26D may be connected in series to each other, and these two serial circuits of the batteries may be connected in parallel to each other.

When the battery cartridge 24 is gotten inserted into and extracted from the battery cartridge housing 70, side plates 66 and 68 of the battery cartridge 24 are brought into contact with the side plates 54 and 56, respectively, of the battery cartridge housing 70, and slide along the side plates 54 and 56, respectively.

The peripheries of the second and fourth batteries 26B and 26D are pressed by the battery pressers 28 provided on the side plates 66 and 68 and between the second and fourth batteries 26B and 26D, so that the second and fourth batteries 26B and 26D are prevented from being displaced or wobbling. On the other hand, the peripheries of the first and third batteries 26A and 26C can come into contact with the fulcrum ribs 30 provided on the side plates 66 and 68 and between the first battery 26A and the third battery 26C.

Plate springs 36 and 38 having a triangular cross section are mounted on the side plates 54 and 56, respectively, of the battery cartridge housing 70. The plate springs 36 and 38 are energized so that they enter into the battery cartridge 24 when the battery cartridge 24 is gotten inserted into or extracted from the battery cartridge housing 70. The first and third batteries 26A and 26C are pressed at their peripheries by the elastic force of the plate springs 36, 38 to wobble about the ribs 30 in the plane of FIG. 2. Instead of the plate springs 36, 38, coil springs or the like may be used.

Lines L1 and L2 indicate positions of the vertexes of the triangular cross sections of the springs 36 and 38, respectively. The ribs 30 on the both sides of the first battery 26A and the ribs 30 on the both sides of the third battery 26C are substantially aligned with each other in the insertion direction of the battery cartridge 24, and the springs 36 and 38 are located at positions spaced apart from each other in the insertion direction of the battery cartridge 24 by a distance substantially equal to a half of the length of the first and third batteries 26A and 26C. Thus, the first and third batteries 26A and 26C are prevented from colliding with each other when they wobble, and the load caused by wobbling of the first and third batteries 26A and 26C when the battery cartridge 24 is gotten inserted into and extracted from the battery cartridge housing 70 is reduced. When the battery cartridge 24 is completely pushed into the battery cartridge housing 70, the vertexes of the triangular cross sections of the springs 36 and 38 are in contact with the peripheries of the second and fourth batteries 26B and 26D.

Now, with reference to FIGS. 2 and 3(*a*) to 3(*e*), there will be described wobbling of the first and third batteries 26A and 26C about the fulcrum ribs 30 occurring when the battery cartridge 24 is gotten extracted from the battery cartridge housing 70 of the digital camera main unit 10 and is then gotten inserted again to and pushed into the battery cartridge housing 70.

FIG. 3(*a*) shows a state where the battery cartridge 24 is completely pushed into the battery cartridge housing 70, similar to that shown in FIG. 2. FIG. 3(*b*) shows a state where the battery cartridge 24, having once extracted from rightward from the state shown in FIG. 3(*a*), is slightly inserted into the battery cartridge housing 70. In FIG. 3(*b*), the spring 38 pushes up the left-hand side part of the third battery 26C at an area distant from the ribs 30 to move the third battery 26C about the ribs 30 clockwise, so that the terminal C− of the third battery 26C is made to rub against the terminal D+ of the fourth battery 26D. At the same time, the terminal C+ of the third battery 26C is made to rub against the terminal 48.

Figure 3A:
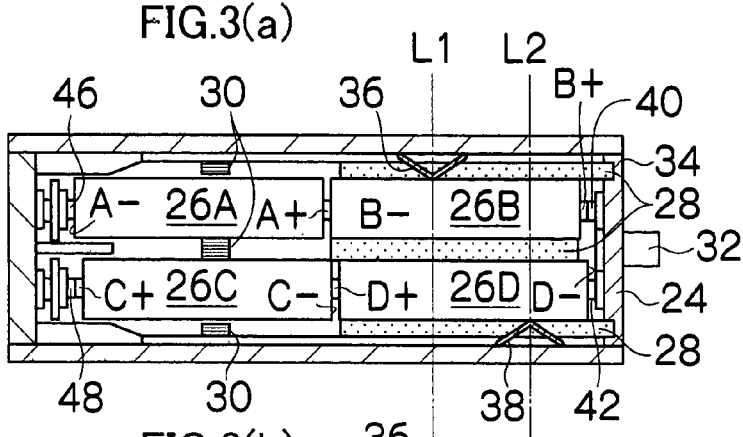
FIGS. 3(a) to 3(e) are sectional views showing wobbling of the batteries made by springs when the battery cartridge having the batteries housed therein is gotten inserted into the battery cartridge housing, viewed from above.
Figure 3B:
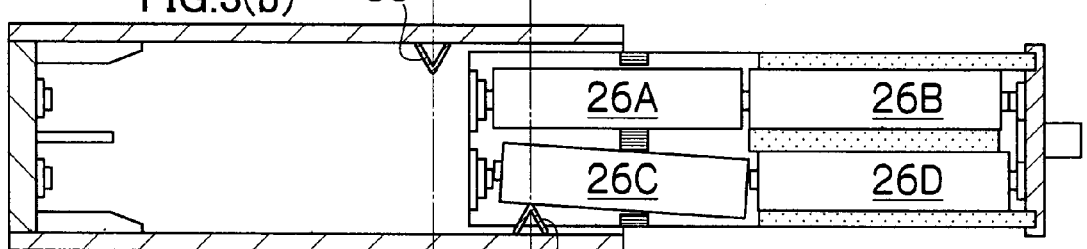
Figure 3C:
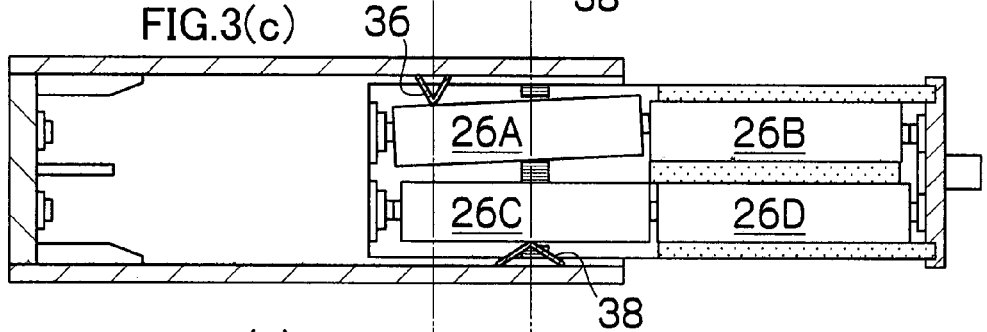

FIG. 3(c) shows a state where the battery cartridge 24 is further pushed into the battery cartridge housing 70 from the state shown in FIG. 3(b). In FIG. 3(c), the spring 36 pushes down the left-hand side part of the first battery 26A to move the first battery 26A about the ribs 30 counterclockwise, so that the terminal A+ of the first battery 26A is made to rub against the terminal B− of the second battery 26B. At the same time, the terminal A− of the first battery 26A is made to rub against the terminal 46. In this state, the spring 38 pushes up a center part of the third battery 26C at an area near the ribs 30.

Figure 3D:
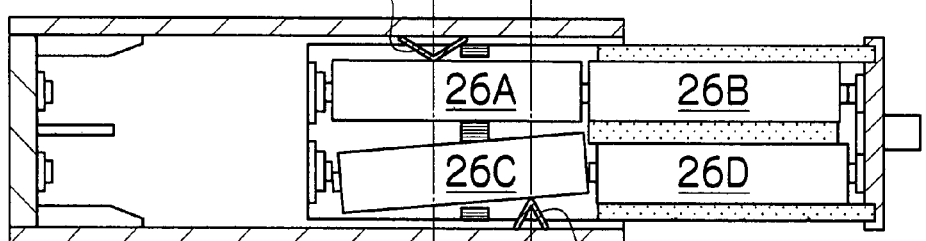

FIG. 3(d) shows a state where the battery cartridge 24 is further pushed into the battery cartridge housing 70 from the state shown in FIG. 3(c). In FIG. 3(d), the spring 38 pushes up the right-hand side part of the third battery 26C at another area distant from the ribs 30 to move the third battery 26C about the ribs 30 counterclockwise, so that the terminal C− of the third battery 26C is made to rub against the terminal D+ of the fourth battery 26D. At the same time, the terminal C+ of the third battery 26C is made to rub against the terminal 48. In this state, the spring 36 pushes down the first battery 26A at an area near the ribs 30.

Figure 3E:
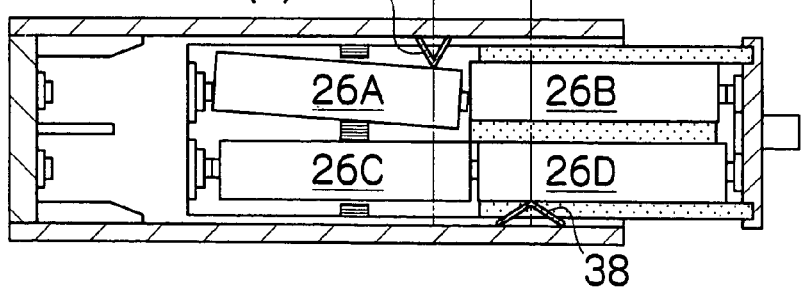

FIG. 3(e) shows a state where the battery cartridge 24 is further pushed into the battery cartridge housing 70 from the state shown in FIG. 3(d). In FIG. 3(e), the spring 36 pushes down the right-hand side part of the first battery 26A at another area distant from the ribs 30 to move the first battery 26A about the ribs 30 clockwise, so that the terminal A+ of the first battery 26A is made to rub against the terminal B− of the second battery 26B. At the same time, the terminal A− of the first battery 26A is made to rub against the terminal 46.

When the battery cartridge 24 is further pushed into the battery cartridge housing 70 from the state shown in FIG. 3(e), the first and third batteries 26A and 26C are guided by the guides 60, 62 and 64 to be aligned with the second and fourth batteries 26B and 26D, respectively, as shown in FIG. 3(a). Thus, it is assured that the terminal A+ of the first battery 26A is brought into contact with the terminal B− of the second battery 26B, the terminal A− of the first battery 26A is brought into contact with the terminal 46, the terminal C− of the third battery 26C is brought into contact with the terminal D+ of the fourth battery 26D, and the terminal C+ of the third battery 26C is brought into contact with the terminal 48.

Thus, during the insertion operation of the battery cartridge 24 into the battery cartridge housing 70, the terminal A+ of the first battery 26A rubs against the terminal B− of the second battery 26B two times, stains on the terminals A+ and B− are thereby removed, and therefore, the contact resistance between the terminals is reduced. At the same time, the terminal A− of the first battery 26A rubs against the terminal 46 two times, stains on the terminal A− and the terminal 46 are thereby removed, and therefore, the contact resistance between the terminals is reduced. Moreover, the terminal C− of the third battery 26C rubs against the terminal D+ of the fourth battery 26D two times, stains on the terminals C− and D+ are thereby removed, and therefore, the contact resistance between the terminals is reduced. At the same time, the terminal C+ of the third battery 26C rubs against the terminal 48 two times, stains on the terminal C+ and the terminal 48 are thereby removed, and therefore, the contact resistance between the terminals is reduced.

Furthermore, also during the extraction operation of the battery cartridge 24 from the battery cartridge housing 70, an action reverse to the above-described action makes the batteries 26A and 26C wobble and the terminals of the batteries 26A to 26D rub against corresponding terminals, whereby stains on the terminals of the batteries 26A to 26D are removed.

That is, when the battery cartridge 24 is gotten inserted into or extracted from the battery cartridge housing 70, the spring 36 presses the periphery of the first battery 26A continuously from an area distant from the ribs 30 to another area distant from the ribs 30 across an area near the ribs 30, thereby making the first battery 26A wobble about the ribs 30. Thus, the terminal A+ of a polarity of the first battery 26A is made to rub against the terminal B− of the opposite polarity of the second battery 26B, whereby stains on the contact surfaces of the terminals A+ and B− are removed.

Furthermore, when the battery cartridge 24 is gotten inserted into or extracted from the battery cartridge housing 70, the spring 38 presses the periphery of the third battery 26C continuously from an area distant from the ribs 30 to another area distant from the ribs 30 across an area near the ribs 30, thereby making the third battery 26C wobble about the ribs 30. Thus, the terminal C− of a polarity of the third battery 26C is made to rub against the terminal D+ of the opposite polarity of the fourth battery 26D, whereby stains on the contact surfaces of the terminals C− and D+ are removed.

In the example described above, the case where the first to fourth batteries 26A to 26D are housed in the battery cartridge 24 has been described. However, the present invention can be applied to a case where only the first and second batteries 26A and 26B are housed in a battery cartridge.

In the above description, the plate springs 36 and 38 having the triangular cross section are used as an example of the elastic body. However, the plate springs may have a semicircular or semi-elliptic cross section, for example. Alternatively, the plate springs may have a semispherical or semi-ellipsoidal shape, for example. If the elastic body has such a shape, the load occurring when the battery cartridge is inserted into and extracted from the battery cartridge housing is advantageously reduced.

According to the present invention, in the battery housing device that houses the batteries connected in series to each other with the terminals thereof being in direct contact with each other, stains on the terminals of the batteries that are in contact with each other can be readily removed without needing a significant effort of the operator, and thus, the contact resistance between the terminals can be reduced.

If the battery housing device according to the present invention is applied to an electronic apparatus such as a digital camera, a decrease of the number of pictures that can be taken due to a voltage drop of the batteries can be avoided.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A battery housing device, comprising:
   a battery cartridge which houses a first battery and a second battery connected in series to each other with a terminal of a polarity at an end of the first battery being pressed against and in direct contact with a terminal of an opposite polarity at an end of the second battery;
   a battery cartridge housing into which the battery cartridge is inserted;

a fulcrum which is arranged on an inner surface of the battery cartridge and configured to come into contact with a periphery of the first battery; and an elastic body which is arranged on an inner surface of the battery cartridge housing, wherein when the battery cartridge is gotten inserted into and extracted from the battery cartridge housing, the elastic body presses the periphery of the first battery continuously from an area distant from the fulcrum to another area distant from the fulcrum across an area near the fulcrum to make the first battery wobble about the fulcrum, thereby making the terminal of the first battery rub against the terminal of the second battery.

2. A battery housing device, comprising:

a battery cartridge which houses first, second, third and fourth batteries, the first battery and the second battery being connected in series to each other with a terminal of a polarity at an end of the first battery being pressed against and in direct contact with a terminal of an opposite polarity at an end of the second battery, the third battery and the fourth battery being connected in series to each other with a terminal of a polarity at an end of the third battery being pressed against and in direct contact with a terminal of an opposite polarity at an end of the fourth battery, the first battery and the third battery being disposed parallel to each other, the second battery and the fourth battery being disposed parallel to each other;

a battery cartridge housing into which the battery cartridge is inserted;

a first fulcrum which is arranged on an inner surface of the battery cartridge and configured to come into contact with a periphery of the first battery;

a second fulcrum which is arranged on the inner surface of the battery cartridge and configured to come into contact with a periphery of the third battery; and first and second elastic bodies which are arranged on an inner surface of the battery cartridge housing, wherein when the battery cartridge is gotten inserted into and extracted from the battery cartridge housing, the first elastic body presses the periphery of the first battery continuously from an area distant from the first fulcrum to another area distant from the first fulcrum across an area near the first fulcrum to make the first battery wobble about the first fulcrum, thereby making the terminal of the first battery rub against the terminal of the second battery, and the second elastic body presses the periphery of the third battery continuously from an area distant from the second fulcrum to another area distant from the second fulcrum across an area near the second fulcrum to make the third battery wobble about the second fulcrum, thereby making the terminal of the third battery rub against the terminal of the fourth battery.

3. The battery housing device as defined in claim 2, wherein:

the first and second fulcrums are substantially aligned with each other in an insertion direction of the battery cartridge; and the first and second elastic bodies are located at positions spaced apart from each other in the insertion direction of the battery cartridge by a distance substantially equal to a half of a length of the first and third batteries.

* * * * *